(12) United States Patent
Lee et al.

(10) Patent No.: US 9,593,953 B2
(45) Date of Patent: Mar. 14, 2017

(54) NAVIGATION SYSTEM WITH LOCATION CORRECTION MECHANISM AND METHOD OF OPERATION THEREOF

(71) Applicant: Telenav, Inc., Sunnyvale, CA (US)

(72) Inventors: Shane-Woei Lee, Fremont, CA (US); Yi-Chung Chao, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 135 days.

(21) Appl. No.: 14/160,268

(22) Filed: Jan. 21, 2014

(65) Prior Publication Data

US 2015/0204680 A1 Jul. 23, 2015

(51) Int. Cl.
*G01S 19/40* (2010.01)
*G01C 21/26* (2006.01)
*G01S 5/02* (2010.01)
*G01S 5/16* (2006.01)

(52) U.S. Cl.
CPC .......... *G01C 21/26* (2013.01); *G01S 5/021* (2013.01); *G01S 5/0263* (2013.01); *G01S 5/16* (2013.01); *G01S 19/40* (2013.01)

(58) Field of Classification Search
CPC ......... G01C 21/26; G01C 21/28; G01S 19/40; G01S 5/021; G01S 5/0263; G01S 5/16
USPC ....................................................... 701/408
See application file for complete search history.

(56) References Cited

U.S. PATENT DOCUMENTS

| 4,903,212 | A | * | 2/1990 | Yokouchi et al. ............ 701/454 |
| 7,117,087 | B2 | | 10/2006 | Jung et al. |
| 7,610,151 | B2 | | 10/2009 | Letchner et al. |
| 7,746,271 | B2 | * | 6/2010 | Furstenberg ............ G01S 1/026 342/357.23 |
| 2006/0189329 | A1 | * | 8/2006 | Anderson .............. G01C 21/28 455/456.6 |
| 2011/0106449 | A1 | | 5/2011 | Chowdhary et al. |
| 2011/0191024 | A1 | | 8/2011 | DeLuca |
| 2012/0197519 | A1 | * | 8/2012 | Richardson ........ G01C 21/3647 701/408 |

OTHER PUBLICATIONS

Murph, Garmin's zumo 660 motorcycle GPS shipping this month, Apr. 2009, Engadget.com.*
GPSmagazine, Garmin nuive 750 Review, Feb. 2008, GPSmagazine.com.*

* cited by examiner

*Primary Examiner* — John Q Nguyen
*Assistant Examiner* — Nadeem Odeh
(74) *Attorney, Agent, or Firm* — IP Investment Law Group (57) ABSTRACT

A method of operation of a navigation system includes: determining a location indicator within a geographic area; determining a traversal position based on a distance from an inanimate object location; determining a position error based on calculating a distance difference between the location indicator and the traversal position; determining an adjustment factor based on an error magnitude of the position error; and generating an update position with a control unit based on updating the location indicator with the adjustment factor for displaying on the device.

20 Claims, 6 Drawing Sheets

FIG. 6 ns, cellular
NAVIGATION SYSTEM WITH LOCATION CORRECTION MECHANISM AND METHOD OF OPERATION THEREOF

TECHNICAL FIELD

The present invention relates generally to a navigation system, and more particularly to a system with location correction mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system improving location correction mechanism to adjust the current location of a device has become a paramount concern for the consumer. The inability decreases the benefit of using the tool.

Thus, a need still remains for a navigation system with location correction mechanism to adjust the current location of a device. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a location indicator within a geographic area; determining a traversal position based on a distance from an inanimate object location; determining a position error based on calculating a distance difference between the location indicator and the traversal position; determining an adjustment factor based on an error magnitude of the position error; and generating an update position with a control unit based on updating the location indicator with the adjustment factor for displaying on the device.

The present invention provides a navigation system, including: a control unit for: determining a location indicator within a geographic area, determining a traversal position for calculating the traversal position based on a distance from an inanimate object location, determining a position error based on calculating a distance difference between the location indicator and the traversal position, determining an adjustment factor based on an error magnitude of the position error, and generating an update position based on updating the location indicator with the adjustment factor, and a communication unit, coupled to the control unit, for communicating the updated position for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
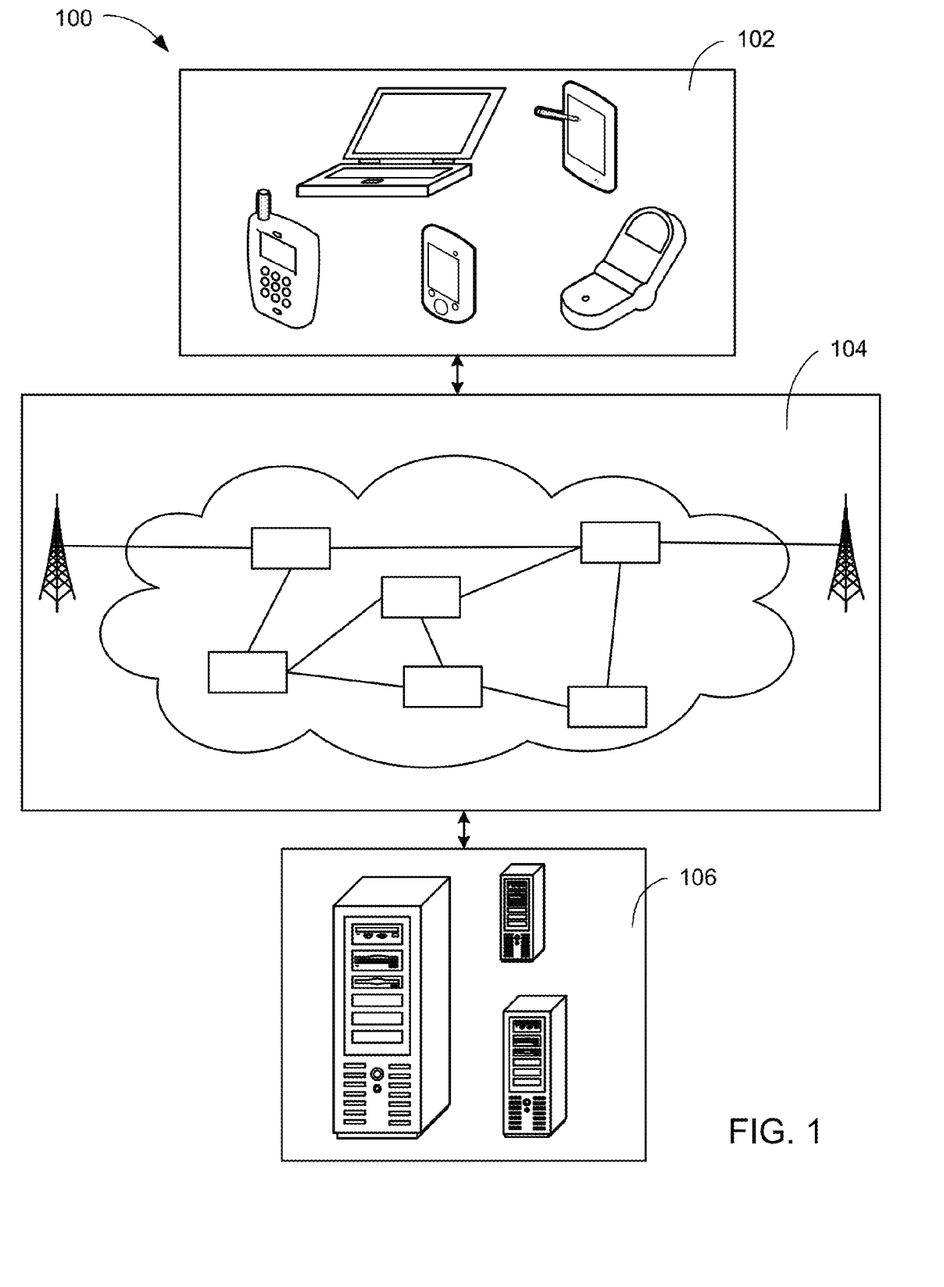
FIG. 1 is a navigation system with location correction mechanism in an embodiment of the present invention.

Referring now to FIG. 1, therein is shown a navigation system 100 with location correction mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
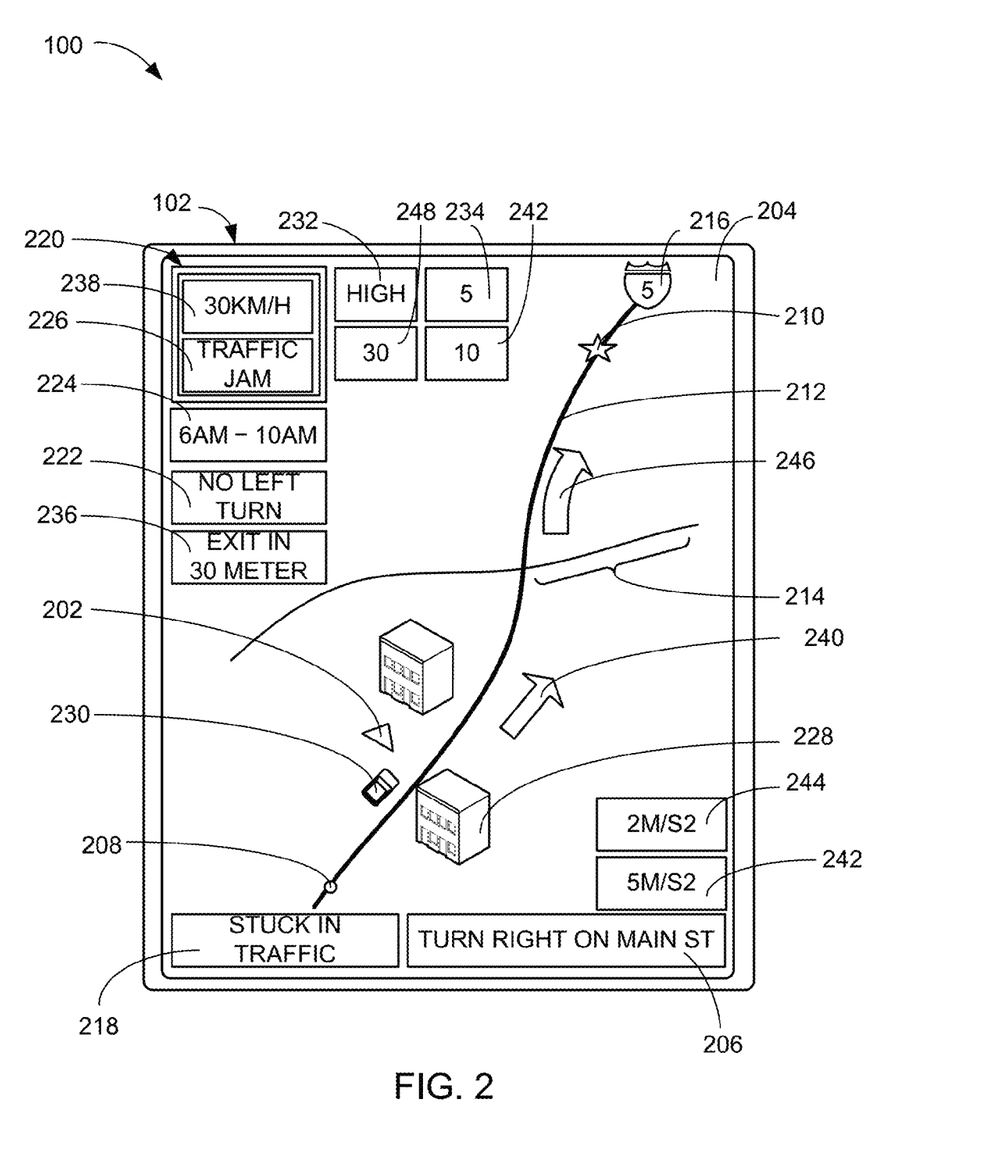
FIG. 2 is an example of a location indicator detected within a geographic area.

Referring now to FIG. 2, there is shown an example of a location indicator 202 detected within a geographic area 204. The location indicator 202 is a representation of a physical location of the first device 102 detected by the global positioning system. For example, the location indicator 202 can represent a current location of the user of the navigation system 100. For another example, the location indicator 202 can represent GPS position fix of the first device 102. For a different example, the location indicator 202 can represent a representation of a physical location based on cell tower triangulation. For clarity and brevity, the discussion of the embodiment of the present invention will focus on the first device 102 delivering the result generated by the navigation system 100. However, the second device 106 of FIG. 1 and the first device 102 can be discussed interchangeably.

The geographic area 204 can represent a region where the user of the navigation system 100 is traversing with the first device 102. A navigation guidance 206 is defined as information to guide user's travel. A start location 208 is defined as a beginning of a travel route 212. A target destination 210 is defined as an end of the travel route 212. The start location 208, the target destination 210, or a combination thereof can represent a waypoint along the travel route 212, which is defined as a path generated by the navigation system 100 for the user's travel. The navigation guidance 206 can include the travel route 212 to aid the user to reach the target destination 210 from the start location 208.

The travel route 212 can include a road segment 214, which can represent a section of the travel route 212. For example, the travel route 212 can include one instance of the road segment 214 for traversing on a local road and another instance of the road segment 214 for traversing on a freeway. A road class 216 is categorization of a path. For example, the road class 216 can represent local road, expressway, freeway, or a combination thereof to categorize the road segment 214. The travel route 212 can include multiple types of the road class 216.

A traversal context 218 is defined as a situation, circumstance, or a combination thereof surrounding the first device 102. For example, the traversal context 218 can be determined by a traversal condition 220. The traversal condition 220 can include a turn restriction 222, a time of day 224, a traffic condition 226, or a combination thereof. The traversal condition 220 can include an obstruction 228, an inanimate object location 230, an interference level 232, or a combination thereof.

The turn restriction 222 is defined as a limitation placed on traversing the road segment 214. For example, the turn the turn restriction 222 of "no left turn" can be placed according to the time of day 224. The time of day 224 can represent daytime, nighttime, or a combination thereof. The time of day 224 can represent a specific time of the day, month, year, or a combination thereof, such as between 6 AM and 10 AM. The traffic condition 226 can represent amount of traffic on the road, accident on the road, or a combination thereof.

The inanimate object location 230 is defined as a representation of a physical location of an inanimate object 330. For example, the inanimate object 330 can include a vehicle, a road fixture, a building, or a combination thereof. Furthermore, the inanimate object 330 can represent the obstruction 228, which is defined as an obstacle that hinders the transfer of GPS signal. The interference level 232 is defined as an amount of interference of the GPS signal by the obstruction 228. An interference threshold 234 is defined as a minimum amount of the interference level 232. The navigation guidance 206 can present the traversal condition 220 on the first device 102.

The traversal context 218 can also include factors such as a traversal intent 236, a traversal speed 238, a traversal heading 240, a traversal acceleration 242, an acceleration shift 244, a heading shift 246, or a combination thereof. The traversal intent 236 is defined as user's intended purpose for traveling along the travel route 212. The traversal speed 238 is defined as a rate of motion for user's travel. The traversal heading 240 is defined as a direction of progress for the user's travel. The traversal acceleration 242 is defined as a rate of change in velocity during user's travel. The acceleration shift 244 is amount of change in the traversal acceleration 242. The heading shift 246 is defined is amount of change in the traversal heading 240. A heading difference 248 is defined as a minimum amount of change in the traversal heading 240 to determine the heading shift 246. For example, the heading shift 248 can be represented as in degrees, meters, or a combination thereof.

Figure 3:
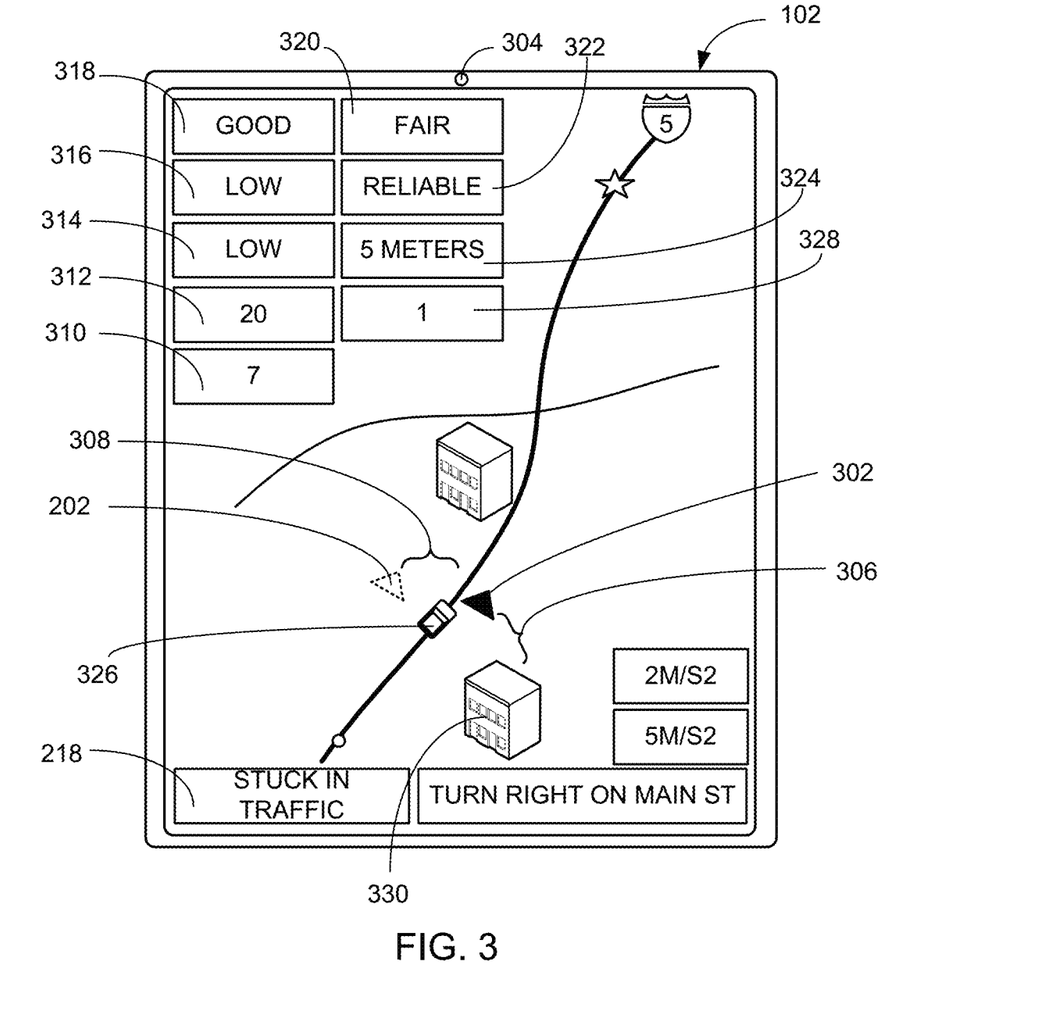
FIG. 3 is an example of updating the location indicator under the traversal context.

Referring now to FIG. 3, there is shown an example of updating the location indicator 202 under the traversal context 218 of FIG. 2. A traversal position 302 is defined as a current location of the first device 102 detected by means other than the global positioning system, cellular-tower location system, or a combination thereof. For example, the traversal position 302 can be detected by a capturing sensor 304. The capturing sensor 304 is defined as a device that captures the traversal condition 220 of FIG. 2 surrounding the first device 102. For example, the capturing sensor 304 can detect the inanimate object location 230 of FIG. 2 of a vehicle in the next lane to the user's vehicle.

A distance 306 can represent the amount of space between the inanimate object location 230 and the traversal position 302. A distance difference 308 is defined as the amount of space between the traversal position 302 and the location indicator 202 of FIG. 2. A positional precision 310 is defined as a value calculated by the geometric dilution of precision (GDOP). A position threshold 312 is defined as the minimum amount of the positional precision 310.

A position error 314 is defined as an inaccuracy of the location indicator 202. An error magnitude 316 is defined as an extent of the position error 314. A position quality 318 is defined as the value indicating the error magnitude 316 of the position error 314 for the location indicator 202. A quality threshold 320 is defined as a minimum value for the position quality 318. For example, the quality threshold 320 can represent "unreliable," "fair," or "reliable." For a different example, the quality threshold 320 can represent the value calculated from GDOP. A position confidence 322 is defined as the value of the position quality 318 meeting or exceeding the quality threshold 320.

An adjustment factor 324 is defined as the value to update the location indicator 202 for generating an update position 326. The update position 326 is defined as the location indicator 202 corrected by factoring the adjustment factor 324. A factor weight 328 is defined as a level of significance placed on the factors for calculating the adjustment factor 324. For example, the factor weight 328 can range from 0 to 1.

Figure 4:
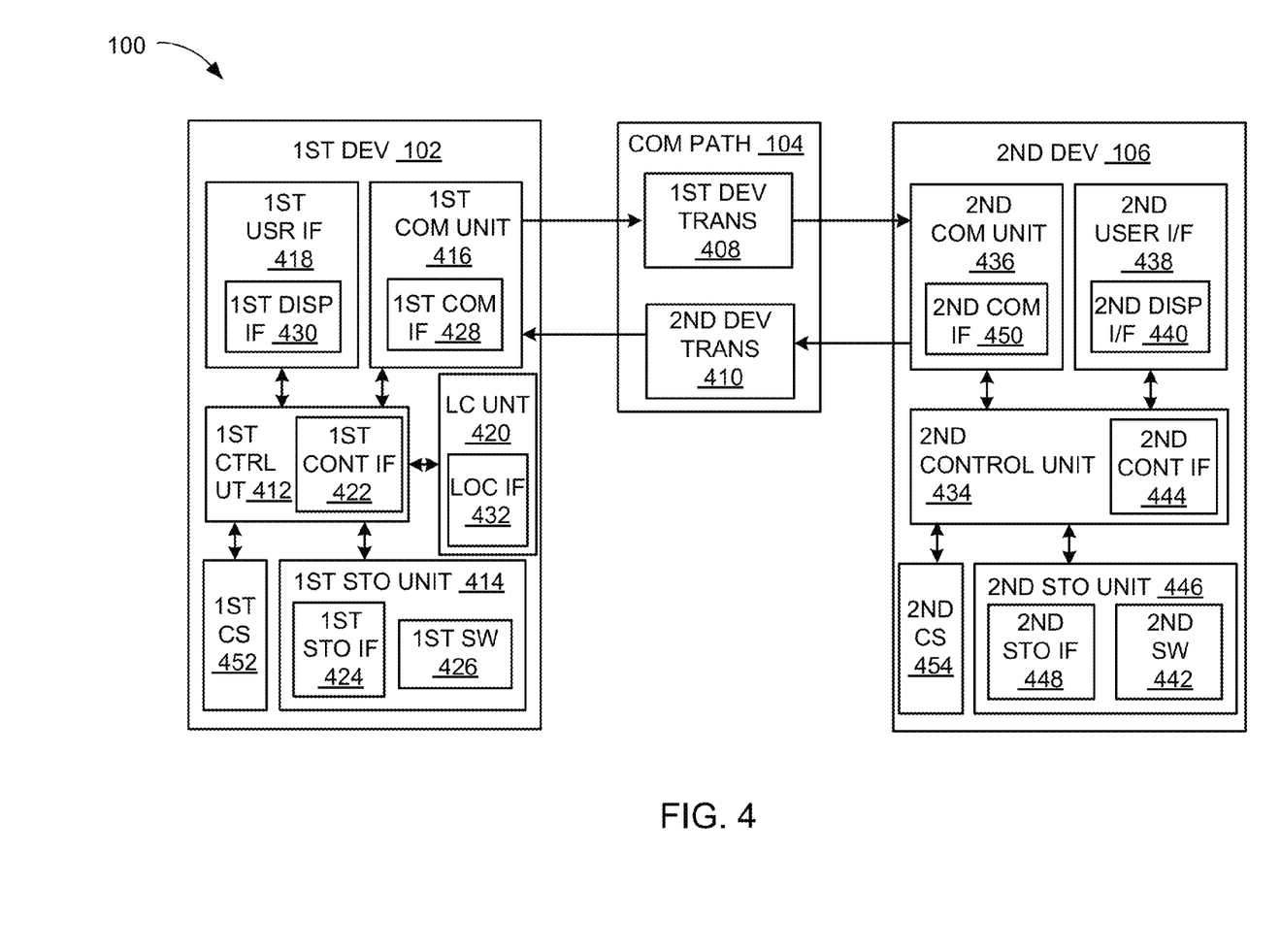
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, softkeys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

A first capturing sensor 452 can represent the capturing sensor 212 of FIG. 2. The first capturing sensor 452 can capture the inanimate object location 230 of FIG. 2 in the traversal context 218 of FIG. 2. The first capturing sensor 452 can capture the inanimate object location 230 from the outside, the inside, or the combination thereof of the user's vehicle.

Examples of the first capturing sensor 452 can include a digital camera, video camera, thermal camera, night vision camera, infrared camera, x-ray camera, or the combination thereof. Examples of the first capturing sensor 452 can include accelerometer, thermometer, microphone, wireless signal receiver, remote physiological monitoring device, light identifier, or the combination thereof.

A second capturing sensor 454 can represent the capturing sensor 212. The second capturing sensor 454 can capture the inanimate object location 230 in the traversal context 218. The second capturing sensor 454 can capture the inanimate object location 230 from the outside, the inside, or the combination thereof of the user's vehicle.

Examples of the second capturing sensor 354 can include a digital camera, video camera, thermal camera, night vision camera, infrared camera, x-ray camera, or the combination thereof. Examples of the second capturing sensor 354 can include accelerometer, thermometer, microphone, wireless signal receiver, remote physiological monitoring device, light identifier, or the combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
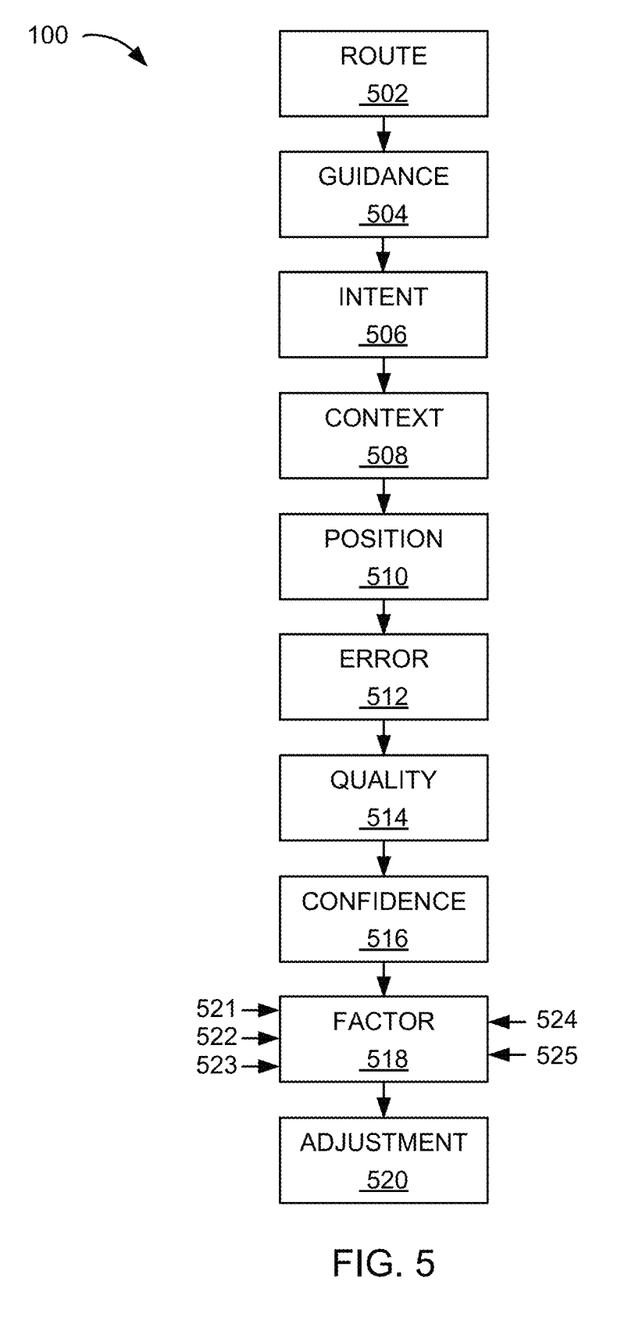
FIG. 5 is a control flow of the navigation system.

Referring now to FIG. 5, therein is shown a control flow of the navigation system 100. The navigation system 100 can include a route module 502. The route module 502 generates the travel route 212 of FIG. 2. For example, the route module 502 can generate the travel route 212 based on connecting a path between the start location 208 of FIG. 2 and the target destination 210 of FIG. 2. For a different example, the route module 502 can generate the travel route 212 based on connecting the path between the location indicator 202 of FIG. 2 and the target destination 210. The route module 502 can determine the location indicator 202 via the location unit 420 of FIG. 4. The route module 502 can send the travel route 212 to a guidance module 504.

The navigation system 100 can include the guidance module 504, which can couple to the route module 502. The guidance module 504 generates the navigation guidance 206 of FIG. 2. For example, the guidance module 504 can generate the navigation guidance 206 based on the travel route 212. More specifically, the guidance module 504 can generate the navigation guidance 206 representing a turn-by-turn direction for traversing the travel route 212. The guidance module 504 can send the navigation guidance 206 to an intent module 506.

The navigation system 100 can include the intent module 506, which can couple to the guidance module 504. The intent module 506 determines the traversal intent 236 of FIG. 2. For example, the intent module 506 can determine the traversal intent 236 based on the travel route 212, the navigation guidance 206, the traversal speed 238 of FIG. 2, the traversal heading 240 of FIG. 2, the traversal acceleration 242 of FIG. 2, or a combination thereof.

The intent module 506 can determine the traversal intent 236 in a number of ways. For example, the intent module 506 can determine the traversal intent 236 based on the travel route 212, the navigation guidance 206, or a combination thereof. More specifically, the intent module 506 can determine the traversal intent 236 of going to the gym or going for dinner based on the target destination 210.

For a different example, the intent module 506 can determine the traversal intent 236 based on the travel route 212, the navigation guidance 206, the traversal heading 240, the traversal acceleration 242, or a combination thereof. More specifically, the first device 102 used by the user of the navigation system 100 can have the traversal acceleration 242 along the Cartesian coordinates of x coordinate, y coordinate, z coordinate, or a combination thereof traveling along the travel route 212. The vehicle with the first device 102 operated by the user of the navigation system 100 can head towards the traversal heading 240 represented by the Cardinal coordinates of, for example, north, south, east, and west. Based on the traversal heading 240 and the traversal acceleration 242, the intent module 506 can determine the traversal intent 236 of staying on the same road, changing road, changing lane, moving up, moving down, or a combination thereof. The intent module 506 can determine the traversal acceleration 242 the capturing sensor 304 of FIG. 3 representing the accelerometer.

For a specific example, the vehicle with the first device 102 operated by the user can have the traversal acceleration 242 in the first quadrant of the Cartesian coordinate where the y coordinate representing the direction where the vehicle is heading and x coordinate representing the lateral movement of the vehicle. Furthermore, the traversal heading 240 can represent that the vehicle is traveling towards northwest. The navigation guidance 206 can represent "go straight for 4 miles." By detecting the traversal speed 238 traveling along the travel route 212, the intent module 506 can determine that the vehicle operated by the user is on a freeway. Based on the traversal acceleration 242, the traversal heading 240, the travel route 212, and the navigation guidance 206, the intent module 506 can determine the traversal intent 236 of changing lane by the user.

For further example, the intent module 506 can detect that the traversal speed 238 can gradually change from 100 kilometers per hour (km/h) to 40 km/h. Along with the traversal acceleration 242 and the traversal heading 240 on the road segment 214 of FIG. 2 on the travel route 212, the intent module 506 can determine the traversal intent 236 of getting off the freeway by the user based on the change in the traversal speed 238.

For another example, the intent module 506 can determine the traversal intent 236 based on the acceleration shift 244 of FIG. 2, the heading shift 246 of FIG. 2, or a combination thereof. More specifically, if the heading shift 246 represents greater than the heading difference 248 representing 30 degrees in angle from the Cardinal point the traversal heading 240 was traveling towards, the intent module 506 can determine that the traversal intent 236 can represent that the user is making a turn.

For a different example, the intent module 506 can determine the traversal intent 236 based on comparing one instance of the acceleration shift 244 with another instance of the acceleration shift 244 for determining the traversal acceleration 242 along the travel route 212. The road class 216 of FIG. 2 can represent freeway. If the acceleration shift 244 for the traversal acceleration 242 along the x coordinate exceeds acceleration shift 244 for the traversal acceleration 242 along the y coordinate, the intent module 506 can determine that the user is changing lane on the freeway. For further example, if the acceleration shift 244 for the traversal acceleration 242 along the z coordinate exceeds equilibrium point of zero, the intent module 506 can determine that the traversal intent 236 of climbing.

For a different example, the intent module 506 can determine the traversal intent 236 with "no confusion" or "with confusion." As discussed above, the intent module 506 can determine the traversal intent 236 of changing lane based on the traversal acceleration 242, the traversal heading 240, the traversal speed 238, the acceleration shift 244, the heading shift 246, or a combination thereof. However, the intent module 506 can detect the factors that conflict with each other. For example, the intent module 506 can detect the traversal heading 240 of north while also detecting the heading shift 246 of greater than 30 degrees based on the GPS signal detected. As a result, the intent module 506 can determine the traversal intent 236 with confusion for failing to determine the traversal intent 236. The intent module 506 can send the traversal intent 236 to a context module 508.

The navigation system 100 can include the context module 508, which can couple to the intent module 506. The context module 508 determines the traversal context 218 of FIG. 2. For example, the context module 508 can determine the traversal context 218 based on the traversal condition 220 of FIG. 2.

The context module 508 can determine the traversal context 218 in a number of ways. For example, the context module 508 can determine the traversal context 218 based on the traversal condition 220 surrounding the vehicle with the user of the navigation system 100 operating the first device 102 and the travel route 212. More specifically, the traversal condition 220 can include the location indicator 202, the road segment 214 of the travel route 212, and the road class 216. Furthermore, the traversal condition 220 can include the turn restriction 222 of FIG. 2, the time of day 224 of FIG. 2, the traffic condition 226 of FIG. 2, or a combination thereof.

The context module 508 can determine the location indicator 202 via the location unit 420 of FIG. 4. Based on the location indicator 202, the context module 508 can determine the road segment 214 of the travel route 212 currently traveled by the user of the navigation system 100. Furthermore, based on comparing the road segment 214 of the travel route 212 to the map information stored on the first storage unit 414 of FIG. 4, the context module 508 can determine the road class 216 where the location indicator 202 is located can represent a highway. The map information can include geographic information of the geographic area 204 of FIG. 2, such as the road class 216 traversing through the geographic area 204. As a result, the context module 508 can determine the traversal context 218 to represent that the user is traveling along the highway.

For further example, the context module 508 can determine the traversal context 218 based on a number of the road segment 214 available within the geographic area 204. More specifically, if the geographic area 204 includes the road segment 214 with the road class 216 of freeway only for the next 100 kilometers, the context module 508 can determine the travel context 218 to represent an open area. In contrast, if the geographic area 204 includes the road segment 214 with a variety of the road class 216, the context module 508 can determine the travel context 218 to represent a metropolitan area.

For another example, the context module 508 can determine the traversal context 218 based on the turn restriction 222, the time of day 224, the traffic condition 226, or a combination thereof. More specifically, at the time of day 224 between 6 AM and 9 AM, the road segment 214 can have the turn restriction 222 of no left turn. The traffic condition 226 also indicates that the flow of traffic is not making a left turn at the road segment 214. As a result, the context module 508 can determine the traversal context 218 representing that the user is driving in a downtown area.

For another example, the context module 508 can determine the traversal context 218 of traversing in the geographic area 204 surrounded by the obstruction 228 of FIG. 2. For example, the context module 508 can determine the traversal context 218 of surrounded by the obstruction 228 based on the interference level 232 of FIG. 2 of the GPS signal. For example, if the interference level 232 is zero, the context module 508 can determine the traversal context 218 without the obstruction 228. In contrast, if the interference level 232 meets or exceeds the interference threshold 234 of FIG. 2, the context module 508 can determine the interference level 232 of low, medium, or high.

For a specific example, the interference threshold 234 can represent frequency of interference, such as 4 times in 10 seconds. If the number of times the interference occurs is less than the interference threshold 234, the context module 508 can determine the interference level 232 of the obstruction 228 to be low. If the number of times the interference occurs is equal to the interference threshold 234, the context module 508 can determine the interference level 232 of the obstruction 228 to be medium. If the number of times the interference occurs is greater than the interference threshold 234, the context module 508 can determine the interference level 232 of the obstruction 228 to be high. The context module 508 can send the traversal context 218 to a position module 510.

The navigation system 100 can include the position module 510, which can couple to the context module 508. The position module 510 determines the traversal position 302 of FIG. 3. For example, the position module 510 can determine the traversal position 302 based calculating the distance 306 of FIG. 3 between the first device 102 and the inanimate object location 230 of FIG. 2.

The position module 510 can determine the traversal position 302 in a number of ways. For example, the position module 510 can determine the traversal position 302 based on comparing the first device 102 to the inanimate object location 230 surrounding the user of the navigation system 100. The position module 510 can compare the physical location of the first device 102 to the physical location of the inanimate object 330 along the Cartesian coordinates of the x, y, and z coordinates. The inanimate object 330 can represent the obstruction 228 that influences the detection of the location indicator 202. For example, the obstruction 228 can represent a building.

For another example, the inanimate object 330 can represent the center divider. The capturing sensor 304 of the first device 102 can determine the distance 306 from the inanimate object location 230 of the center divider and the first device 102 based on infrared distance measuring, sonar distance measuring, image measurement, or a combination thereof. Based on the distance 306 from the inanimate object location 230 and the first device 102, the position module 510 can determine the traversal position 302 within the road segment 214.

For a different example, the first device 102 can include the capturing sensor 304 to detect the presence of the inanimate object 330 representing another vehicle. Based on the relative position between the another vehicle and the first device 102, the position module 510 can determine the traversal position 302 of which lane the user's vehicle is currently traversing within the road segment 214.

For a different example, the inanimate object 330 can represent multi-level freeway. More specifically, the inanimate object location 230 can represent the bottom of the freeway located above where the user is currently traversing. The position module 510 can determine the traversal position 302 of the user of the navigation system 100 traveling along the lower level and not along the top level of the multi-level freeway by the capturing sensor 304 capturing the distance 306 between the first device 102 and the bottom of the freeway above the first device 102. The position module 510 can send the traversal position 302 to an error module 512.

The navigation system 100 can include the error module 512, which can couple to the position module 510. The error module 512 determines the position error 314 of FIG. 3. For example, the error module 512 can determine the position error 314 based on comparing the traversal position 302 and the location indicator 202.

The error module 512 can determine the position error 314 in a number of ways. For example, the error module 512 can determine the position error 314 based on the positional precision 310 of FIG. 3 meeting or being less than the position threshold 312 of FIG. 3. The positional precision 310 can represent the geometric dilution of precision (GDOP). The GDOP can include the horizontal DOP, vertical DOP, positional DOP, time DOP, or a combination thereof. More specifically, the positional precision 310 can range from 1 to 20 and greater with 1 representing an ideal rating for the positional precision 310 while 20 or greater representing a poor rating for the positional precision 310. The positional precision 310 of 1 can represent 6 meters. The position threshold 312 can represent 20 or 120 meters. If the positional precision 310 ranges between 1 and 20, thus meeting or below the position threshold 312, the error module 512 can determine the position error 314 to be less than 120 meters. In contrast, if the positional precision 310 is greater than 20, thus the position threshold 312 exceeding the position threshold 312, the error module 512 can determine the position error 314 to be greater than 120 meters.

For further example, the error module 512 can determine the position error 314 based on calculating the distance difference 308 of FIG. 3 between the traversal position 302 and the location indicator 202. More specifically, if the distance difference 308 between the traversal position 302 and the location indicator 202 is greater than the position threshold 312, the error module 512 can determine the position error 314 to be greater than 120 meters. In contrast, if the distance difference 308 between the traversal position 302 and the location indicator 202 is less than the position threshold 312, the error module 512 can determine the position error 314 to be less than 120 meters.

For another example, the error module 512 can determine the error magnitude 316 of FIG. 3 of the position error 314 based on the positional precision 310. More specifically, the positional precision 310 can be categorized according to the following: 1 is ideal; 1 to 2 is excellent; 2 to 4 is good; 4 to 10 is moderate; 10 to 20 is fair; and 20 and greater is poor. Correspondingly to the positional precision 310, the error magnitude 316 can be categorized according to the following: 1 is negligible; 1 to 2 is minimal; 2 to 4 is low; 4 to 10 is moderate; 10 to 20 is fair; and 20 and greater is high, respectively. As discussed above, the positional precision 310 of 1 can represent the distance difference 308 of 6 meters. As a result, for example, the error module 512 can determine the error magnitude 316 based on the distance difference 308 between the traversal position 302 and the location indicator 202. And the error module 512 can determine the position error 314 based on the error magnitude 316 of the distance difference 308. If the distance difference 308 is 150 meters, the error module 512 can determine the error magnitude 316 to be high, thus, the position error 314 to be high. The error module 512 can send the position error 314 to a quality module 514.

The navigation system 100 can include the quality module 514, which can couple to the error module 512. The quality module 514 determines the position quality 318 of FIG. 3. For example, the quality module 514 can determine the position quality 318 of the location indicator 202.

For a specific example, the quality module 514 can determine the position quality 318 based on the position error 314 of the location indicator 202 relative to the traversal position 302. More specifically, as discussed above, the quality module 514 can determine the position quality 318 based on the positional precision 310 or the error magnitude 316 of the position error 314. For example, the quality module 514 can determine the position quality 318 of the location indicator 202 with the error magnitude 316 of 1 to be excellent. In contrast, the quality module 514 can determine the position quality 318 with the error magnitude 316 of 15 to be fair. The quality module 514 can send the position quality 318 to a confidence module 516.

The navigation system 100 can include the confidence module 516, which can couple to the quality module 514. The confidence module 516 determines the position confidence 322 of FIG. 3. For example, the confidence module 516 can determine the position confidence 322 based on the position quality 318. More specifically, the confidence module 516 can determine the position confidence 322 based on the position quality 318 meeting or exceeding the quality threshold 320 of FIG. 3. For example, if the position quality 318 meets or exceeds the quality threshold 320, the confidence module 516 can determine the position confidence 322 to represent "confident" or "reliable." In contrast, if the position quality 318 is below the quality threshold 320, the confidence module 516 can determine the position confidence 322 to represent "no confident" or "unreliable." The confidence module 516 can send the position confidence 322 to a factor module 518.

The navigation system 100 can include the factor module 518, which can couple to the confidence module 516. The factor module 518 determines the adjustment factor 324 of FIG. 3. For example, the factor module 518 can determine the adjustment factor 324 based on weighting the traversal intent 236, the traversal context 218, the position error 314, the position quality 318, the position confidence 322, or a combination thereof.

The factor module 518 can determine the adjustment factor 324 in a number of ways. For example, the factor module 518 can determine the adjustment factor 324 based on summing the traversal intent 236, the traversal context 218, the position error 314, the position quality 318, the position confidence 322, or a combination thereof. More specifically, the factor module 518 can determine the adjustment factor 324 by factoring the factor weight 328 of FIG. 3 to adjust the consideration of the traversal intent 236, the traversal context 218, the position error 314, the position quality 318, the position confidence 322, or a combination thereof. The factor weight 328 can include an intent weight 521, a context weight 522, an error weight 523, a quality weight 524, a confidence weight 525, or a combination thereof.

The intent weight 521 can represent the factor weight 328 for the traversal intent 236. The context weight 522 can represent the factor weight 328 for the traversal context 218. The error weight 523 can represent the factor weight 328 for the position error 314. The quality weight 524 can represent the factor weight 328 for the position quality 318. The confidence weight 525 can represent the factor weight 328 for the position confidence 322.

More specifically, the calculation of the adjustment factor 324 can be the represented by the function below:

adjustment factor 324=Sum(intent weight 521*traversal intent 236+context weight 522*traversal context 218+error weight 523*position error 314+quality weight 524*position quality 318+confidence weight 525*position confidence 322)

For example, the traversal intent 236 can represent with "no confusion." The traversal context 218 can represent traveling through the geographic area 204 without the obstruction 228. As a result, the error weight 523, the quality weight 524, the confidence weight 525, or a combination thereof can be set to a value of zero because no adjustment is required for the location indicator 202. The factor module 518 can determine the adjustment factor 324 to be set to a value of zero.

For another example, the factor module 518 can adjust the factor weight 328 based on the traversal context 218. For a specific example, the traversal context 218 can represent traveling through the geographic area 204 with the obstruction 228 causing the interference level 232 of high. The traversal intent 236 can represent with "no confusion." As a result, the factor module 518 can increase the error weight 523, the quality weight 524, the confidence weight 525, or a combination thereof to be 1 or greater to correct the position error 314 of the location indicator 202.

For another example, the factor module 518 can adjust the factor weight 328 based on the heading shift 246 meeting or exceeding the heading difference 248 of FIG. 2. If the heading shift 246 is under the heading difference 248, the traversal intent 236 can represent going straight. As a result, the factor module 518 can increase the factor weight 328 representing the intent weight 521 of going straight. In contrast, the factor weight 328 representing the intent weight 521 can be set to 0 because the value of the heading shift 246 was under the heading difference 248.

More specifically, if the heading shift 246 is meets or exceeds the heading difference 248, the traversal intent 236 can represent turning. As a result, the factor module 518 can increase the factor weight 328 representing the intent weight 521 of turning and set the intent weight 521 for going straight to 0.

It has been discovered that the navigation system 100 adjusting the factor weight 328 according to the traversal context 218 improves the accuracy of correcting the position error 314 of the location indicator 202. By factoring the traversal context 218, the navigation system 100 can tailor the factor weight 328 required to determine the adjustment factor 324. As a result, the navigation system 100 can determine the adjustment factor 324 accurately to correct the location indicator 202 for the safer operation of the navigation system 100, the vehicle, or a combination thereof.

For further example, the factor module 518 can determine the adjustment factor 324 based on the position error 314. More specifically, if the position error 314 is low, the factor module 518 can determine the adjustment factor 324 based on the error magnitude 316, the positional precision 310 of 1, or a combination thereof. For a specific example, the factor module 518 can determine the adjustment factor 324 of 12 meters based on the product of the error magnitude 316 of 2 was multiplied to the positional precision 310 of 1.

More specifically, the positional precision 310 can represent whether the DOP is representing the horizontal DOP, vertical DOP, positional DOP, time DOP, or a combination thereof. As a result, the factor module 518 can determine the adjustment factor 324 for horizontal adjustment, vertical adjustment, or a combination thereof. Moreover, the factor module 518 can determine the adjustment factor 324 based on the position error 314 calculated by the distance difference 308 between the traversal position 302 and the location indicator 202. The factor module 518 can send the adjustment factor 324 to an adjustment module 520.

It has been discovered that the navigation system 100 determining the adjustment factor based on the distance difference 308 improves the accuracy of locating the user with the first device 102. By comparing the traversal position 302 and the location indicator 202, the navigation system 100 can determine how accurate the location indicator 202 is. As a result, the navigation system 100 can determine the adjustment factor 324 accurately to correct the location indicator 202 for the safer operation of the navigation system 100, the vehicle, or a combination thereof.

The navigation system 100 can include the adjustment module 520, which can couple to the factor module 518. The adjustment module 520 generates the update position 326 of FIG. 3. For example, if the adjustment factor 324 was 4 for the horizontal DOP, the adjustment module 520 can generate the update position 326 by updating the location indicator 202 with the adjustment factor 324 by 30 meters horizontally. More specifically, the adjustment module 520 can generate the update position 326 by updating the location indicator 202 to match the traversal position 302.

The physical transformation from traveling from one instance of the traversal context 218 to another instance of the traversal context 218 results in the movement in the physical world, such as people using the first device 102, the vehicle, or a combination thereof, based on the operation of the navigation system 100. As the movement in the physical world occurs, the movement itself creates additional information that is converted back into the traversal position 302, the position error 314, or a combination thereof to generate the adjustment factor 324 to update the location indicator 202 for the continued operation of the navigation system 100 and to continue the movement in the physical world.

The first software 426 of FIG. 4 of the first device 102 of FIG. 4 can include the modules for the navigation system 100. For example, the first software 426 can include the route module 502, the guidance module 504, the intent module 506, the context module 508, the position module 510, the error module 512, the quality module 514, the confidence module 516, the factor module 518, and the adjustment module 520.

The first control unit 412 of FIG. 4 can execute the first software 426 for the route module 502 to generate the travel route 212. The first control unit 412 can execute the first software 426 for the guidance module 504 to generate the navigation guidance 206. The first control unit 412 can execute the first software 426 for the intent module 506 to determine the traversal intent 236.

The first control unit 412 can execute the first software 426 for the context module 508 to determine the traversal intent 236. The first control unit 412 can execute the first software 426 for the position module 510 to determine the traversal position 302. The first control unit 412 can execute the first software 426 for the error module 512 to determine the position error 314.

The first control unit 412 can execute the first software 426 for the quality module 514 to determine the position quality 318. The first control unit 412 can execute the first software 426 for the confidence module 516 to determine the position confidence 322. The first control unit 412 can execute the first software 426 for the factor module 518 to determine the adjustment factor 324. The first control unit 412 can execute the first software 426 for the adjustment module 520 to generate the update position 326.

The second software 442 of FIG. 4 of the second device 106 of FIG. 4 can include the modules for the navigation system 100. For example, the second software 442 can include the route module 502, the guidance module 504, the intent module 506, the context module 508, the position module 510, the error module 512, the quality module 514, the confidence module 516, the factor module 518, and the adjustment module 520.

The second control unit 434 of FIG. 4 can execute the second software 442 for the route module 502 to generate the travel route 212. The second control unit 434 can execute the second software 442 for the guidance module 504 to generate the navigation guidance 206. The second control unit 434 can execute the second software 442 for the intent module 506 to determine the traversal intent 236.

The second control unit 434 can execute the second software 442 for the context module 508 to determine the traversal intent 236. The second control unit 434 can execute the second software 442 for the position module 510 to determine the traversal position 302. The second control unit 434 can execute the second software 442 for the error module 512 to determine the position error 314.

The second control unit 434 can execute the second software 442 for the quality module 514 to determine the position quality 318. The second control unit 434 can execute the second software 442 for the confidence module 516 to determine the position confidence 322. The second control unit 434 can execute the second software 442 for the factor module 518 to determine the adjustment factor 324. The second control unit 434 can execute the second software 442 for the adjustment module 520 to generate the update position 326.

The modules of the navigation system 100 can be partitioned between the first software 426 and the second software 442. The second software 442 can include the guidance module 504, the intent module 506, the context module 508, the position module 510, the error module 512, the quality module 514, the confidence module 516, and the factor module 518. The second control unit 434 can execute modules partitioned on the second software 442 as previously described.

The first software 426 can include the route module 502 and the adjustment module 520. Based on the size of the first storage unit 414 of FIG. 4, the first software 426 can include additional modules of the navigation system 100. The first control unit 412 can execute the modules partitioned on the first software 426 as previously described.

The first control unit 412 can operate the first communication unit 416 of FIG. 4 to communicate the travel route 212, the update position 326, or a combination thereof to or from the second device 106. The first control unit 412 can operate the first software 426 to operate the location unit 420 of FIG. 4. The second control unit 434 can operate the second software 442 for the second communication unit 436 of FIG. 4 to communicate the adjustment factor 324, the update position 326, or a combination thereof to or from the first device 102 through the communication path 104 of FIG. 4.

The first control unit 512 can operate the first user interface 518 of FIG. 5 to present the updated position 326. The second control unit 534 can operate the second user interface 538 of FIG. 5 to present the updated position 326.

The navigation system 100 describes the module functions or order as an example. The modules can be partitioned differently. For example, the error module 512 and the quality module 514 can be combined. Each of the modules can operate individually and independently of the other modules. Furthermore, data generated in one module can be used by another module without being directly coupled to each other. For example, the factor module 518 can receive the traversal context 218 from the context module 508.

It has been discovered that the navigation system 100 can determine the traversal position 302 in addition to the location indicator 202 within the geographic area 204. By determining the traversal position 302, the navigation system 100 can calculate the distance difference 308 to determine the position error 314. As a result, the navigation system 100 can determine the adjustment factor 324 to correct the location indicator 202 for displaying the update position 326 to the first device 102. By displaying the update position 326, the navigation system 100 can improve the safety of the user operating the navigation system 100, the vehicle, or a combination thereof.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 3. However, it is understood that the first control unit 312, the second control unit 334, or a combination thereof can collectively refer to all hardware accelerators for the modules.

The modules described in this application can be implemented as instructions stored on a non-transitory computer readable medium to be executed by a first control unit 412, the second control unit 434, or a combination thereof. The non-transitory computer medium can include the first storage unit 414 of FIG. 4, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
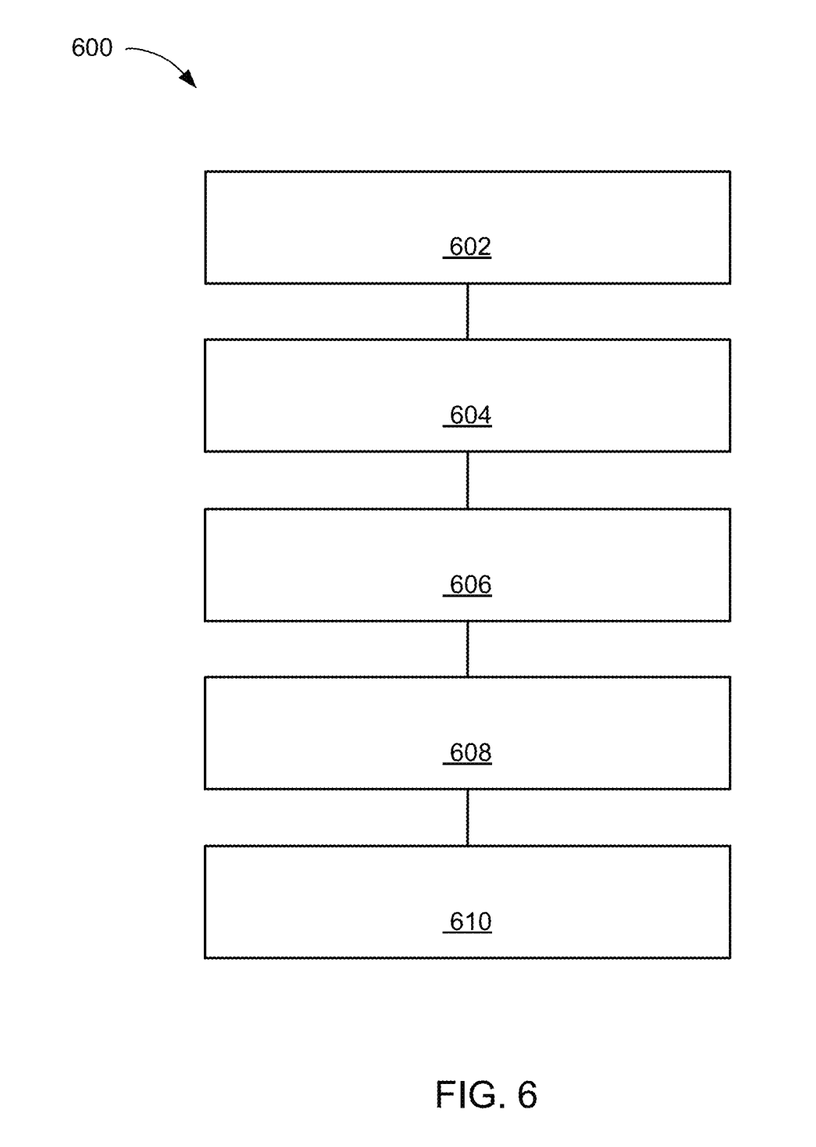
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a location indicator within a geographic area in a block 602; determining a traversal position based on a distance from an inanimate object location in a block 604; determining a position error based on calculating a distance difference between the location indicator and the traversal position in a block 606; determining an adjustment factor based on an error magnitude of the position error in a block 608; and generating an update position with a control unit based on updating the location indicator with the adjustment factor for displaying on the device in a block 610.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation executed by a navigation system, the method comprising:
    determining a location indicator within a geographic area, the location indicator representing a physical location of a device detected by a global positioning system within the geographic area representing a region traversed by a user with the device;
    detecting an inanimate object location by capturing an obstruction with a capturing sensor, the obstruction being an obstacle hindering a transfer of a global positioning system signal, wherein the inanimate object location represents the physical location of the obstruction;
    determining a distance by measuring an amount of space, with the capturing sensor, between the inanimate object location of the obstruction and the physical location of the device;
    determining a traversal position based on the distance for detecting the physical location of the device without the global positioning system;
    determining a position error representing an inaccuracy of the location indicator based on whether a distance difference between the location indicator and the traversal position is greater or less than a position threshold;
    determining an adjustment factor based on an error magnitude of the position error; and
    generating an update position with a control unit based on updating the location indicator with the adjustment factor for displaying on the device.

2. The method as claimed in claim 1 wherein determining the position error includes determining the position error based on a positional precision of the location indicator meeting or being less than the position threshold.

3. The method as claimed in claim 1 further comprising determining a traversal intent representing a user's intended purpose for traveling along a travel route based on comparing one instance of an acceleration shift with another instance of the acceleration shift for determining a traversal acceleration, the travel acceleration representing a rate of change in velocity during a user's travel along the travel route by tracking the acceleration shift of the user with the device.

4. The method as claimed in claim 1 further comprising determining a traversal context based on an interference level meeting or exceeding an interference threshold for identifying the interference level representing an amount of interference caused by the obstruction hindering the transfer of the global positioning system signal within the traversal context representing a user's travel along a travel route.

5. The method as claimed in claim 1 further comprising determining the error magnitude representing an extent of the position error based on a positional precision of the location indicator.

6. The method as claimed in claim 1 further comprising determining a position quality of the location indicator based on the position error of the location indicator relative to the traversal position.

7. The method as claimed in claim 1 further comprising determining a position confidence of a position quality based on the position quality meeting or exceeding a quality threshold.

8. The method as claimed in claim 1 wherein determining the adjustment factor includes determining the adjustment factor by factoring a factor weight for adjusting a consideration of the position error.

9. The method as claimed in claim 1 wherein determining the adjustment factor includes determining the adjustment factor based on weighting the position error with an error weight.

10. The method as claimed in claim 1 further comprising determining a traversal context based on a time of day for indicating a traffic condition within the geographic area.

11. A navigation system comprising:
    a control unit configured for:
        determining a location indicator within a geographic area, the location indicator representing a physical location of a device detected by a global positioning system within the geographic area representing a region traversed by a user with the device,
        detecting an inanimate object location by capturing an obstruction with a capturing sensor, the obstruction being an obstacle hindering a transfer of a global positioning system signal, wherein the inanimate object location represents the physical location of the obstruction,
        determining a distance by measuring an amount of space, with the capturing sensor, between the inanimate object location of the obstruction and the physical location of the device,
        determining a traversal position based on the distance for detecting the physical location of the device without the global positioning system, determining a position error representing an inaccuracy of the location indicator based on whether a distance difference between the location indicator and the traversal position is greater or less than a position threshold, determining an adjustment factor based on an error magnitude of the position error, and generating an update position based on updating the location indicator with the adjustment factor, and a communication unit, coupled to the control unit, for communicating the updated position for displaying on the device.

12. The system as claimed in claim 11 wherein the control unit is configured for determining the position error based on a positional precision of the location indicator meeting or being less than the position threshold.

13. The system as claimed in claim 11 wherein the control unit is configured for determining a traversal intent representing a user's intended purpose for traveling along a travel route based on comparing one instance of an acceleration shift with another instance of the acceleration shift for determining a traversal acceleration, the traversal acceleration representing a rate of change in velocity during a user's travel along the travel route by tracking the acceleration shift of the user with the device.

14. The system as claimed in claim 11 wherein the control unit is configured for determining a traversal context based on an interference level meeting or exceeding an interference threshold for identifying the interference level representing an amount of interference caused by the obstruction hindering the transfer of the global positioning system signal within the traversal context representing a user's travel along a travel route.

15. The system as claimed in claim 11 wherein the control unit is configured for determining the error magnitude representing an extent of the position error based on a positional precision of the location indicator.

16. The system as claimed in claim 11 wherein the control unit is configured for determining a position quality of the location indicator based on the position error of the location indicator relative to the traversal position.

17. The system as claimed in claim 11 wherein the control unit is configured for determining a position confidence of a position quality based on the position quality meeting or exceeding a quality threshold.

18. The system as claimed in claim 11 wherein the control unit is configured for determining the adjustment factor by factoring a factor weight for adjusting a consideration of the position error.

19. The system as claimed in claim 11 wherein the control unit is configured for determining the adjustment factor based on weighting the position error with an error weight.

20. The system as claimed in claim 11 wherein the control unit is configured for determining a traversal context based on a time of day for indicating a traffic condition within the geographic area.

* * * * *